Dec. 16, 1924.

E. R. CORNEIL 1,519,957

FLUID TRANSMISSION MECHANISM

Filed Sept. 13, 1922     3 Sheets-Sheet 1

E. R. Corneil.
INVENTOR

Dec. 16, 1924. 1,519,957
E. R. CORNEIL
FLUID TRANSMISSION MECHANISM
Filed Sept. 13, 1922  3 Sheets-Sheet 2
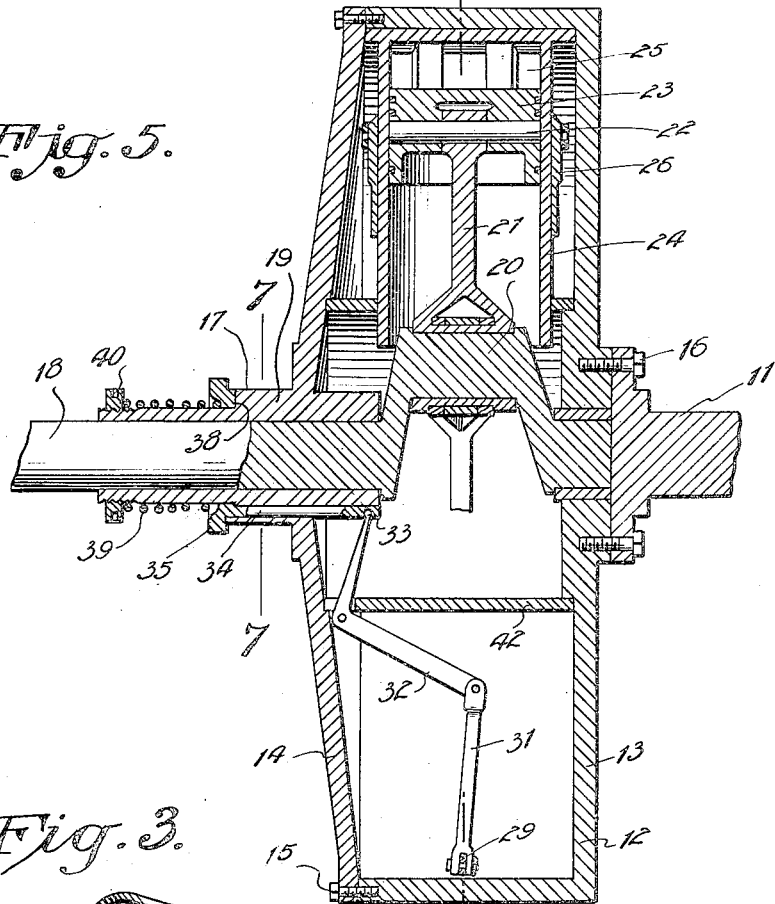
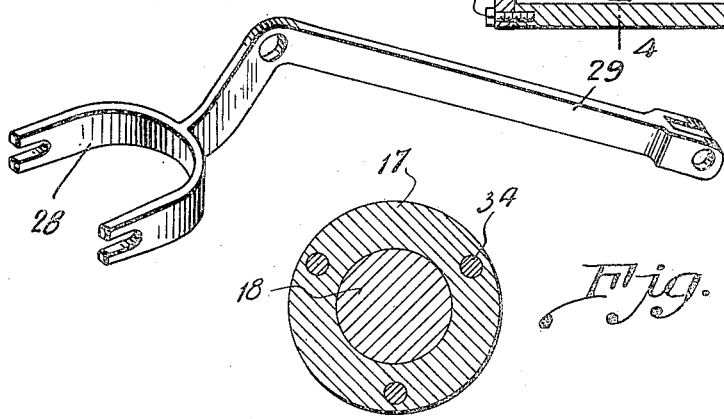
E. R. Corneil
INVENTOR
BY Victor J. Evans
ATTORNEY
WITNESS:

Dec. 16, 1924.

E. R. CORNEIL 1,519,957

FLUID TRANSMISSION MECHANISM

Filed Sept. 13, 1922     3 Sheets-Sheet 2

E. R. Corneil
INVENTOR

BY Victor J. Evans
ATTORNEY

WITNESS:

Patented Dec. 16, 1924.

1,519,957

UNITED STATES PATENT OFFICE.

ERNEST R. CORNEIL, OF OMEMEE, ONTARIO, CANADA.

FLUID-TRANSMISSION MECHANISM.

Application filed September 13, 1922. Serial No. 588,047.

*To all whom it may concern:*

Be it known that I, ERNEST R. CORNEIL, a subject of the King of Great Britain, residing at Omemee, in the Province of Ontario and Dominion of Canada, have invented new and useful Improvements in Fluid-Transmission Mechanism, of which the following is a specification.

This invention relates to improvements in transmission mechanisms and has for an object the provision of means for transmitting power from a drive to a driven shaft.

Another object of the invention is the provision of means for automatically locking the driven shaft to the drive shaft, so that the said shafts will operate at substantially the same speed at a predetermined number of revolutions per minute (for example, engine speed) and for manually controlling the operation of the driven shaft, so that the latter may be locked to or released from the drive shaft, when desired.

Another object of the invention is the provision of a transmission mechanism which may be included in the fly-wheel of an engine and which, when used for driving automobiles, will eliminate the shifting of gears and the operation of a clutch mechanism and in addition will provide practically unlimited speed range and flexibility, as well as a reduction in upkeep and engine wear.

With the above and other objects in view, the invention further includes the following novel features and details of construction, to be hereinafter more fully described, illustrated in the accompanying drawings and pointed out in the appended claim.

In the drawings:—

Figure 3 is a detail view of one of the rocker arms.

Figure 5 is a section on the line 5—5 of Figure 4.

Figure 7 is a section on the line 7—7 of Figure 5.

Figure 1:
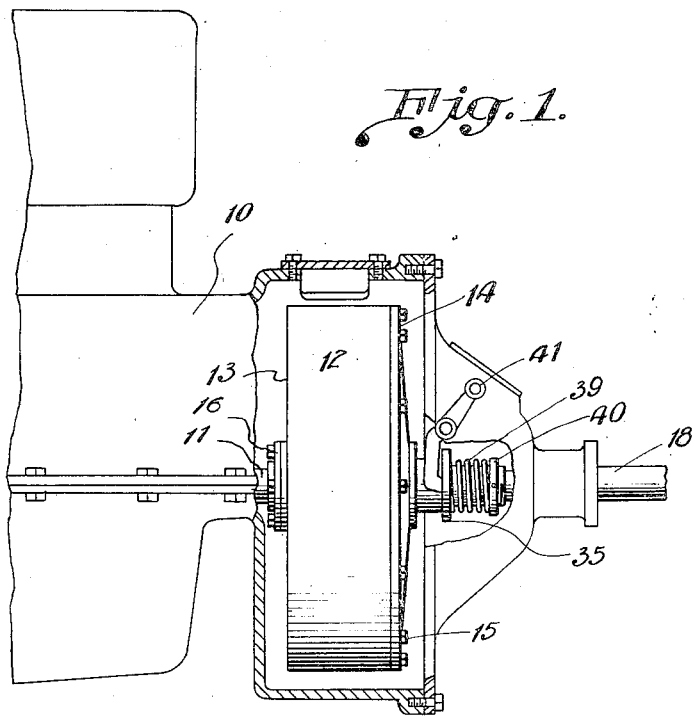
Figure 1 is a view of a portion of an engine with the invention applied thereto.
Figure 2:
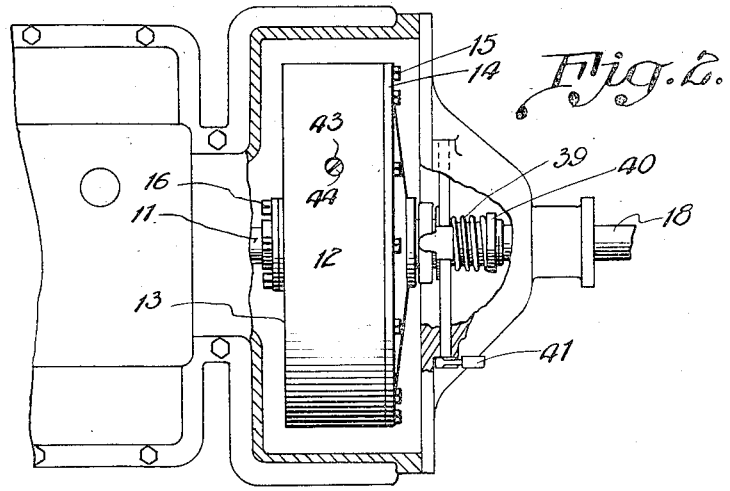
Figure 2 is a top plan view of the same.
Figures 4, 6:
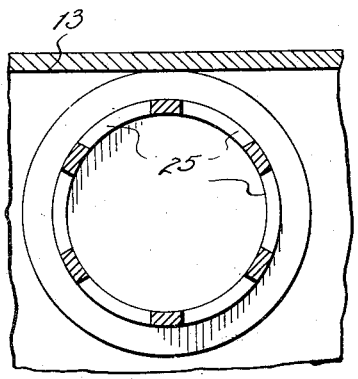
Figure 4 is a section on the line 4—4 of Figure 5.
Figure 6 is a detail section on the line 6—6 of Figure 4.

Referring in detail to the drawings, wherein like characters of reference denote corresponding parts, the invention which may be utilized upon any machine where the load is variable for the purpose of transmitting power from a drive to a driven shaft without the use of clutches and gear ratios, is shown as applied to an engine of the internal combustion type, to which it is especially applicable for the purpose of controlling the transmission of power from the engine to the traction wheels of motor cars and tractors. A portion of the engine is indicated at 10 and the drive shaft or crank shaft is shown at 11, while the engine fly-wheel is indicated at 12.

In the present instance this fly-wheel is of hollow construction and provides a casing 13 having an open face which is closed by a removable cover 14. The cover is secured to the casing by means of screws 15 and the casing is secured to the end of the drive shaft 11 by screws or similar fastening devices 16, so that when the engine is in operation, the casing 13 will rotate therewith.

The cover 14 of the casing is provided with a bearing 17 and located within this bearing is a driven shaft 18 and when the invention is used for the operation of an automobile, this shaft 18 will represent the torque or differential drive shaft. The shaft 18 has its inner end mounted within a bearing 19 provided in the casing 13 and includes a crank 20, to which is connected a plurality of rods 21, having wrist pin connections 22 with pistons 23. These pistons operate within cylinders 24 secured and arranged at equi-distant spaced intervals within the casing 13 and at an angle with respect to each other. The pistons are adapted to operate within said cylinders when the drive shaft operates at a different speed from the driven shaft. The cylinders are provided with (preferably six) ports 25, which are controlled by a sleeve valve 26, one of which is slidable upon each of the cylinders 24. The valves 26 carry radially extending pins 27 which are engaged by the bifurcated ends of yokes 28, the latter forming a part of rocker arms 29 which are pivotally secured to the casing 13 as shown at 30. The outer or free ends of the rocker arms 29 are connected by means of links 31 and bell crank levers 32 and the latter are in turn connected as shown at 33 to the inner ends of longitudinally and axially movable rods 34, the outer ends of which are connected to a clutch collar 35. The clutch collar operates upon the outer periphery of a sleeve which forms a part of the bearing 17 and abuts a shoulder 38 formed thereon, being yieldingly held against this shoulder by means of a coiled spring 39, having one end bearing against the clutch collar 35 and its opposite end bearing against an adjusting nut 40. This nut 40 is threadedly engaged with the sleeve of the bearing 17 and may be adjusted thereon to regulate the tension of the spring 39.

The clutch collar is manually moved along the sleeve bearing 17 by means of a clutch lever 41, which may be connected to a suitable foot pedal for convenient operation by the driver of an automobile. The bell cranks 32 are pivotally secured upon an annular partition 42 whch is arranged concentrically of the shafts 11 and 18 and acts to support the inner ends of the cylinders 24, in addition to providing a baffle against the passage of fluid within the casing. Fluid is supplied to the casing through an opening 43 which is closed by a plug 44.

In the operation of the invention, when the engine is started, a rotary motion will be imparted to the casing 13, but as the ports 25 are uncovered, a free passage of oil is permitted therethrough, so that the shaft 18 remains stationary with the casing and cylinders revolving around said shaft and fluid within the casing passing into and being expelled from the cylinders. As soon as the shaft 11 attains sufficient speed, centrifugal force will move the sleeves 26 outward to cover or partially cover the ports 25, whereupon the passage of fluid through these ports will be checked or retarded, so that the pistons may not draw the fluid inward and force the same outward at sufficient speed to work freely and a clutching action is then exerted upon the shaft 18. This action is governed by the degree at which the ports 25 are covered and this degree is controlled by the speed of operation of the shaft 11. The centrifugal operation of the sleeves 26 is resisted by the tension of the spring 39 and the latter is so adjusted that when the shaft 11 attains a predetermined number of revolutions per minute, (for example, engine speed) the shaft 18 will be rotating at the same speed as the shaft 11. The clutching action between the shaft 11 and the shaft 18 is thus automatically controlled by the speed of operation of the former.

In order to manually control the relative speeds of the shafts 11 and 18, the clutch lever 41 is operated so as to manually move the clutch collar 35 and through the connections of this clutch collar with the sleeves 26, operate the sleeves to control the amount of fluid passing through the ports 25. Thus, when the engine is operating at sufficient speed to automatically lock the shaft 18 to the shaft 11, the former may be entirely or partially released through the manual operation of the clutch lever 41.

Upon an overload being placed upon the shaft 18 so as to reduce the engine speed below normal working capacity, the tension on the governor spring overcomes the centrifugal force of the sleeves 26, so that the latter will open the ports and will continue to open until the engine speed increases. This permits the shaft 18 to rotate at a slower rate than engine speed until the overload is relieved, when the valves or sleeves 26 will automatically operate to again close the ports. Slow speed may be obtained by throttling the engine to any speed under working or normal speed, when the same action will take place as in an overload. In order to stop the operation of the shaft 18 without stopping the operation of the shaft 11, the clutch lever 41 is operated to assist the spring 29 in overcoming the centrifugal force of the sleeves 26, so that the ports may be forced open and held in such position as long as desired.

The invention is susceptible of various changes in its form, proportions and minor details of construction and the right is herein reserved to make such changes as properly fall within the scope of the appended claim.

Having described the invention what is claimed is:—

A power transmission mechanism comprising in combination with a drive shaft and a driven shaft having a cranked end, of a fluid casing receiving the cranked end of the driven shaft and having secured thereto the drive shaft for rotation thereof, an annular partition surrounding the cranked end of the driven shaft, a plurality of equi-distantly spaced cylinders extending from the inner periphery of the casing and having their inner ends received by the partition, said cylinders being disposed at an angle with respect to each other and being provided with elongated fluid ports extending around the outer ends thereof, sleeve valves operatively associated with the fluid ports, bell crank levers pivotally secured to the partition intermediate ther ends and having means of connection with the sleeve valves, a spring pressed clutch collar surrounding the driven shaft, axially movable rods operated by the clutch collar and connected to the bell crank levers, and pistons operating within the cylinders as and for the purpose specified.

In testimony whereof I affix my signature.

ERNEST R. CORNEIL.